United States Patent [19]

Lerminiaux

[11] Patent Number: 5,268,976
[45] Date of Patent: Dec. 7, 1993

[54] INTEGRATED OPTICAL PROXIMITY COUPLER

[75] Inventor: Christian Lerminiaux, Fontainebleau, France

[73] Assignee: Corning Incorporated, Corning, N.Y.

[21] Appl. No.: 993,712

[22] Filed: Dec. 18, 1992

[30] Foreign Application Priority Data

Dec. 27, 1991 [FR] France .................. 91 16240

[51] Int. Cl.$^5$ .................................................. G02B 6/26
[52] U.S. Cl. ........................................ 385/30; 385/50
[58] Field of Search ............... 385/15, 16, 17, 20, 385/21, 22, 27, 30, 39, 42, 43, 46, 48, 50; 359/109, 113, 114, 115, 124

[56] References Cited

U.S. PATENT DOCUMENTS

4,652,076 3/1987 Unger ........................... 350/96.12

FOREIGN PATENT DOCUMENTS

| 0130223 | 1/1985 | European Pat. Off. |  |
|---|---|---|---|
| 61-56306 | 3/1986 | Japan | 385/27 |
| 63-254404 | 10/1988 | Japan | 385/27 |

OTHER PUBLICATIONS

Cheng et al., "A Dual Wavelength (1.32-1.56 μm) Directional Coupler Multiplexer by Ion Exchange in Glass.", *IEEE Phototonics Technology Letters*, vol. 2 No. 9, Sep. 1990, pp. 637-639, New York, U.S.
Najafi et al., "Potassium Ion Exchanged Glass Waveguide Directional Couplers at 0.6328 and 1.3 μm", *Applied Optics*, vol. 28, No. 13, Jul. 1, 1989, pp. 2459-2460, New York, U.S.
Cheng et al., "Determination of the Coupling Length in Directional Couplers from Spectral Response", *IEEE Phototonics Technology Letters*, vol. 2, No. 11, Nov. 1990, pp. 823-825, New York, U.S.
Suzuki et al., "High Glass Waveguide Multi/Demultiplexers with Small Device Size and Low Wavelength Response Sensitivity", The Transactions of the Institute of Electronics, Information and Comm. Engineers, vol. E.73, No. 1, Jan. 1990, pp. 99-103, Tokyo, Japan.

*Primary Examiner*—Rodney B. Bovernick
*Assistant Examiner*—John Ngo
*Attorney, Agent, or Firm*—K. McNeill Taylor, Jr.

[57] ABSTRACT

The coupler comprises two waveguides imbedded in a substrate and exhibiting a coupling region of length L establishing coupling coefficients ($C_1$) and ($C_2$) for the signals of the wavelengths ($\lambda_1$) and ($\lambda_2$) respectively. Following the invention, the length (L) and the coefficients ($C_1$) and ($C_2$) are linked by the relationship:

$$C_1 \cdot L = n \frac{\pi}{2} \text{ and } C_2 \cdot L = m \frac{\pi}{2}$$

where n and m are integers, one uneven and the other even, chosen in such a manner as to establish a pass band of predetermined width (BP1, BP2) around at least one of the wavelengths ($\lambda_1$) and ($\lambda_2$). The invention has application to multiplexers/demultiplexers for optical fiber telecommunications.

6 Claims, 1 Drawing Sheet

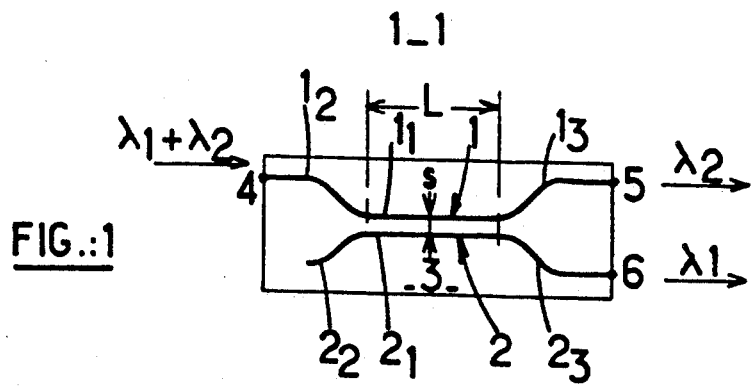
FIG.:1
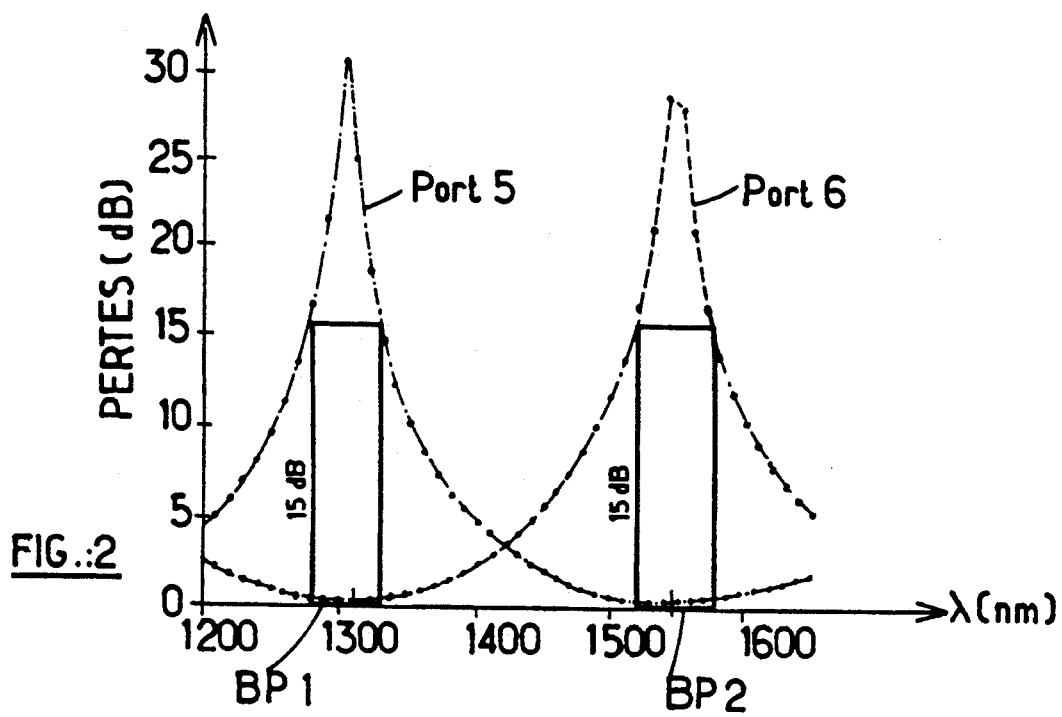
FIG.:2
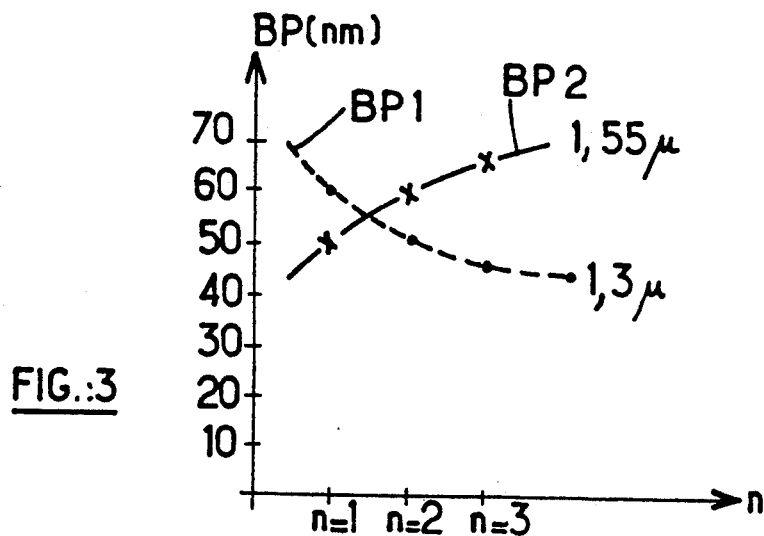
FIG.:3

INTEGRATED OPTICAL PROXIMITY COUPLER

BACKGROUND OF THE INVENTION

The present invention relates to an integrated optical proximity coupler intended to separate or combine two signals of different wavelengths. More particularly, the invention relates to such a coupler, exhibiting predetermined pass bands surrounding these wavelengths in the sense which will be given below in this discussion.

We are familiar with proximity couplers such as the one which is schematically represented in FIG. 1 of the attached design in the present patent application. Such a coupler is currently being utilized in the multiplexing-/demultiplexing of two signals of different wavelengths.

The coupler of FIG. 1 comprises two waveguides 1,2 integrated by an ion exchange such as the thallium ion, for example, in a glass substrate 3 or in a crystalline substrate. The exchange of ions is carried out across a mask which defines the form of the waveguides. These consist of straight inter-action segments $1_1$, $2_1$, parallel and adjoining, and approach parts $1_2$, $1_3$, and $2_2$, $2_3$ respectively, connected to entries/exits or "ports" 4, 5, 6, ports 5, 6 being separated by a distance which is a function of the diameter of the coated optical fibers (not represented) which are connected to these ports.

Thus, signals of wavelengths $\lambda_1$, and $\lambda_2$ ($\lambda_1 < \lambda_2$) entering by port 4 exit separately through port 6 and 5, the signal at one of the wavelengths passing into waveguide 2 because of the passage of evanescent waves in the substrate between the straight inter-action segments $1_1$ and $2_1$ of the guides, in particular. The response curve of such a coupler typically takes the form represented in FIG. 2, which makes visible two attenuation peaks centered on the wavelengths $\lambda_1 = 1310$ nm and $\lambda_2 = 1550$ nm, as is the case for example, when one utilizes such a coupler for optical fiber telecommunications. It is clear that the signal at wavelength $\lambda_2 = 1550$ nm is highly attenuated at port 6, while the signal at wavelength $\lambda_1 = 1310$ nm is practically not, and inversely at port 5. One can thus separate, for example, a video signal carrier signal from an audio-signal carrier signal transmitted in the same optical fiber. The same signals can be reunited in the same fiber by advancing in the opposite direction in the coupler of FIG. 1.

The transfer of signal from one guide to the other is governed by the relationship:

$$P = \sin^2(C(s,\lambda),L)$$

where P is the power transferred from one guide to the other, $C(s,\lambda)$ is a coefficient of coupling which depends upon the separation (or distance) s between the axes of the straight interaction segments of the guides, and upon the wavelength of the signal utilized, and L the length of the straight interaction segments.

In order to obtain a good separation of the signals it is appropriate that:

$$C(s,\lambda_1) \cdot L = n\frac{\pi}{2}$$

and $$C(s,\lambda_2) \cdot L = m\frac{\pi}{2}$$

n and m being integers, one odd, the other even. We call such a coupler, a coupler of the type (n,m). By choosing the parameters which occur in these equations in such a way that they can be satisfied, we find the entire power of the signals of the wavelengths and $\lambda_1$ and $\lambda_2$ at exits 6 and 5 respectively, without having a fraction of one interfere with the other at each of the exits.

This is what we observe practically speaking in the graph of FIG. 2 where it appears that for wavelengths $\lambda_1$ and $\lambda_2$, the fraction of one signal which strays to the other is reduced by 30 dB approximately. Around these two wavelengths, the attenuations are less strong and one is hence led to define a "pass band" (bandwidth) around each of the two wavelengths in order to characterize the selectivity of a proximity coupler. In this respect there exists a need for a means which would permit the adjustment of this pass band. Such a need exists, for example, when one wishes to have at one's disposal a pass band of increased width around one of the two wavelengths, permitting one to tolerate the utilization of a source of signal whose wavelength can be defined less precisely around the utilization wavelength. Such a tolerance can be advantageous from the point of view of the cost of the source in question.

The present invention has as its object, therefore, furnishing a proximity coupler of the type described above, conceived in such a manner as to exhibit a predetermined pass band for one of the two signals which are to be separated to combined in the coupler.

We attain this object of the invention, as well as others which will appear upon reading the description which will follow, with an integrated optical proximity coupler for the separation or combining of two signals of wavelength $\lambda_1$ and $\lambda_2$ in increasing order, comprising two waveguides imbedded in a substrate and exhibiting a coupling region of length L establishing coupling coefficients $C_1$ and $C_2$ for signals of wavelengths $\lambda_1$ and $\lambda_2$, respectively, characterized in that the length L of the coefficients $C_1$ and $C_2$ are linked by the relationships:

$$C_1 \cdot L = n\frac{\pi}{2} \text{ and } C_2 \cdot L = m\frac{\pi}{2}$$

where n and m are uneven and even integers respectively, chosen in such a manner as to establish a pass band of predetermined width around at least one of the wavelengths $\lambda_1$ and $\lambda_2$.

We can thus adjust a pass band to a given tolerance affecting the wavelength of one source and one of the two signals, the deference to this tolerance being potentially advantageous for reasons of cost of manufacture of said source, for example.

In accordance with a preferred embodiment of the invention, m = n + 1, the waveguides of the coupler being singlemode, symmetrical and integrated by ion exchange in a substrate. In a particular application to optical fiber telecommunications, $\lambda_1 = 1310$ nm and $\lambda_2 = 1550$ nm, the width of the pass band around the wavelength $\lambda_2$ being greater than the width of the band around the wavelength $\lambda_1$. The pass band of predetermined width is obtained by adjusting the length L and the separation of the two guides in the coupling region.

Other characteristics and advantages of the coupler in accordance with the invention will appear upon reading the description which will follow and upon examination of the attached design in which:

FIG. 1 is a diagram of an integrated optical proximity coupler and FIG. 2 is the response curve of such a coupler, these figures having already been presented as an introduction to the present description, and FIG. 3 represents the graph of the variations in width of the pass bands of a proximity coupler which one can obtain by the implementation of the present invention.

As a non-limiting example, the present invention will be illustrated in its application to a proximity coupler of symmetric singlemode waveguides, integrated by thallium ion exchange, for example, in a glass substrate, this proximity coupler being destined to multiplex or demultiplex signals of wavelength $\lambda_1 = 1310$ nm and $\lambda_2 = 1550$ nm, typically utilized in a standardized system of optical telecommunications fiber.

Within this illustrative framework one must further define the notion of "isolation" and the notion "pass band" in order to exhibit the present invention.

One measures the isolation by the ratio of the exit powers of the two signals at the same exit of the coupler. A perfect isolation corresponds to the total absence of one of the two signals at the exit being considered.

In the discussion which follows we will call a "pass band" around wavelength $\lambda_i$ ($\lambda_1$ for example) the spectral width in which the ratio of the exit powers at ports 5 and 6 of the proximity coupler is greater than 15 dB.

Further, we come back to couplers of a design of the type (n, m), such as were defined above. One must remark that n and m designate the number of inter-guide transfers of the two signals. It is clear that the number n of transfers of signal of wavelength $\lambda_1$ necessary in order to cause the latter to appear at one of the exits, must be of a different parity from the number m, the number of transfers necessary in order to cause the signal of wavelength $\lambda_2$ go out at the other exit.

In choosing n and m such that (m−n) is large, the spectral response of the couplers is very sharp, around the wavelengths $\lambda_1$ and $\lambda_2$ which are being considered, the pass bands being then narrow.

In effect, when m and n are very different from one another, the signals of the two wavelengths undergo transfers in very different numbers. If we considers that the wavelengths between $\lambda_1$ and $\lambda_2$ will exit entirely at the same port as $\lambda_1$, all the wavelengths undergoing n+2p transfers, n+2p being between n and m, and will exit entirely from the same port as $\lambda_2$, all of the wavelengths undergoing m−2q transfers, m−2q must also be between n and m.

The luminous power emanating from the port from which $\lambda_1$ exits will therefore be at a maximum, beyond that for wavelength $\lambda_1$, for every other wavelength such that the number of transfers is n+2p. The spectral response of the component will contain then (p+1) peaks (p being the integer part or the integer closest below) of (m−n/2). It will, as a result, be much sharper. We thus produce a coupler permitting a very selective multiplexing for the two wavelengths being considered.

Nevertheless, the most interesting case for demultiplexing two pass bands which are as broad as possible, corresponds to that in which the response is the least sharp possible, that is to say where there are no intermediate peaks in the spectral response ((p=0) i.e., m−n<2).

In accordance with the present invention we therefore act upon the value of n (m being equal to n+1) to adjust the width of the pass band around the wavelength $\lambda_2$, for example. We have represented in FIG. 3 the widths of the pass bands BP1 and BP2 around $\lambda_1$ and $\lambda_2$ respectively for various values of n, the number of transfers of light between guides at the wavelengths $\lambda_1 = 1310$ nm. We see that when m increases, the width of the pass band at $\lambda_2 = 1550$ nm increases, as the width of the pass band at $\lambda_1$ 1310 nm decreases. FIG. 3 recaptures the values represented in the following table:

| n | 1 | 2 | 3 |
|---|---|---|---|
| BP1 | 61 nm | 51 nm | 47 nm |
| BP2 | 51 nm | 60 nm | 67 nm |
| L μm | 15.5 < L < 16.5 | 12 < L < 13 | 10.7 < L < 11.6 |
| s μm | 8.5 < s < 9.5 | 4.8 < s < 5.8 | 4.5 < s < 5.5 |

We have also represented in this table the values of the length L of the interaction region of the coupler and of the separations of the center lines of the guides in this region, which permits us to obtain the widths of the pass bands BP1 and BP2 which are indicated.

These values are determined easily as satisfying the following equations:

$$C(s,\lambda_1) \cdot L = n\frac{\pi}{2}$$

and $$C(s,\lambda_2) \cdot L = m\frac{\pi}{2}$$

where C (s, $\lambda$) represents the coupling coefficient between the two guides, which is a function of the utilization wavelength and of the separation s between guides.

From this table it results that if one wishes to have a wider pass band around $\lambda_2$ than around $\lambda_1$, it is appropriate to dimension L and s in such a way as to establish a number n of transfers between guides for the signal of wavelength $\lambda_1$, which may be greater than 1, n=3, for example.

With this solution, one has at his disposal a pass band BP2 around $\lambda_2$ of 67 nm, when around one has BP1=47 nm. In optical fiber telecommunications, one utilizes currently lasers emitting as a source of radiation. The production of lasers emitting at a wavelength of 1550 nm is more difficult and therefore more expensive than that of lasers emitting at 1310 nm. It is therefore interesting from an economic point of view to be able to allow a greater tolerance on the wavelength of emission of a laser, nominally at 1550 nm permitting the production of the laser at a lesser cost. It is clear that the solution brought about above which permits one to obtain a pass band around $\lambda_2$ of 67 nm and of 47 nm around $\lambda_1$ permits one to achieve this objective. Following the present invention, this is obtained by an appropriate choice of the numbers n and m of signal transfers between guides, established by a dimensioning suitable to the region of interaction or, more generally, the "coupling lengths" CL which characterize this region.

Incidentally, we will remark that the enlarging of the pass band around 1550 nm obtained by the present invention permits one to envisage a more frequent use of this window of wavelengths notably in telecommunications and therefore to utilize optical amplifiers, which the present technology does not provide in the other window centered at 1310 nm. One may therefore be tempted to utilize the window BP2 more frequently, notably for the services distributed by optical fibers. A greater bandwidth permits the transmission of a larger number of services if one envisages the distribution of each service at a different wavelength as is envisioned in the article "Dense Wavelength Division Multiplexing Networks—Principles and Applications" by Charles A. Brackett in the IEEE Journal on Selected Areas in Communications 08/1990, Vol. 8, No. 6, pgs. 948-964.

Of course the present invention is not limited to the embodiment described and represented which has been given only as an example. Thus, the invention is not limited to proximity couplers conforming to the classical design represented in FIG. 1 and it extends to couplers or filters such as those described in the French patent application No. 9-115992 filed 23 December 1991 by the applicant and entitled "Optical Apparatus with Proximity Coupling Between Two Integrated Waveguides with Reduced Dimension and Integrated Optical Components Made by Application Thereof".

I claim:

1. Integrated optical proximity coupler for the separation or the combination of two signals of wavelengths $\lambda_1$ and $\lambda_2$ in increasing order, comprising two waveguides buried in a substrate and exhibiting a coupling region of length L establishing coupling coefficients $C_1$ and $C_2$ for the signals of wavelengths $\lambda_1$ and $\lambda_2$ respectively, characterized by the fact that the length L and the coefficients $C_1$ and $C_2$ are linked by the relationships:

$$C_1 \cdot L = n\frac{\pi}{2} \text{ and } C_2 \cdot L = m\frac{\pi}{2}$$

where n and m are integers, one uneven and the other even, chosen in such a way as to establish a pass band of predetermined width around at least one of the wavelengths $\lambda_1$ and $\lambda_2$.

2. A coupler conforming to claim 1, characterized by the fact that m=n+1.

3. A coupler conforming to any one of the claims 1 and 2 characterized in that the waveguides are singlemode, symmetrical and integrated by ion exchange in a substrate.

4. A coupler conforming to claim 3, characterized in that $\lambda_1 = 1310$ nm and $\lambda_2 = 1550$ nm.

5. A coupler conforming to claim 4, characterized in that the width of the pass band around one of the wavelengths $\lambda_1$ and $\lambda_2$ is greater than the width of the band around the other wavelength.

6. A coupler conforming to claim 5, characterized in that the pass band of predetermined width is obtained by adjusting the length L and the distance s between the axes of the two waveguides in the coupling region.

* * * * *

UNITED STATES PATENT AND TRADEMARK OFFICE
CERTIFICATE OF CORRECTION

PATENT NO. : 5,268,976
DATED      : December 7, 1993
INVENTOR(S): Christian Lerminiaux It is certified that error appears in the above-indentified patent and that said Letters Patent is hereby corrected as shown below:

Col. 2, line 5 remove "and", (first occurrence).

Col. 2, line 29, change "to" (second occurrence) to -- or --.

Col. 4, line 6, between "$\lambda_1$" and "1310" insert -- = --.

Col. 4, line 41, after "around" (second occurrence), insert -- $\lambda_1$ --.

Signed and Sealed this

Second Day of August, 1994

Attest:

BRUCE LEHMAN

Attesting Officer    Commissioner of Patents and Trademarks